United States Patent

Leyburn et al.

[15] 3,670,109

[45] June 13, 1972

[54] TELEPHONE TRANSLATING APPARATUS

[72] Inventors: Derek Leyburn, Mississauga, Ontario; Bernard R. Montague, Dollard des Ormeaux, Quebec; Henry K. Mattila, Roxboro, Quebec, all of Canada

[73] Assignee: Bell Canada, Montreal, Quebec, Canada

[22] Filed: June 29, 1970

[21] Appl. No.: 50,493

[30] Foreign Application Priority Data

July 3, 1969 Great Britain......................33,656/69

[52] U.S. Cl. ........................................................179/18 ET
[51] Int. Cl. ........................................................H04q 3/47
[58] Field of Search ..............................................179/18 ET

[56] References Cited

UNITED STATES PATENTS 3,011,029 11/1961 Henning et al....................179/18 ET
3,413,419 11/1968 Klees et al........................179/18 EA

*Primary Examiner*—William C. Cooper
*Attorney*—Philip T. Erickson

[57] ABSTRACT

A telephone system translator for translating input codes each made up of a number of code digits into translations each made up of a number of information bits including a decoder to initiate a direct route connection and capable of providing an alternate route when a direct route is not available. The invention also extends to the provision of two translator preference units and an exclusion gate unit capable of selective connection to one or both of the translator preference units and also extends to the exclusion gate unit including a plurality of stages each associated with a respective decoder stage; each of the exclusion gate stages is capable of being rendered non-responsive if a prior call is being handled by another one of said exclusion gate stages.

9 Claims, 12 Drawing Figures

Figure 1:
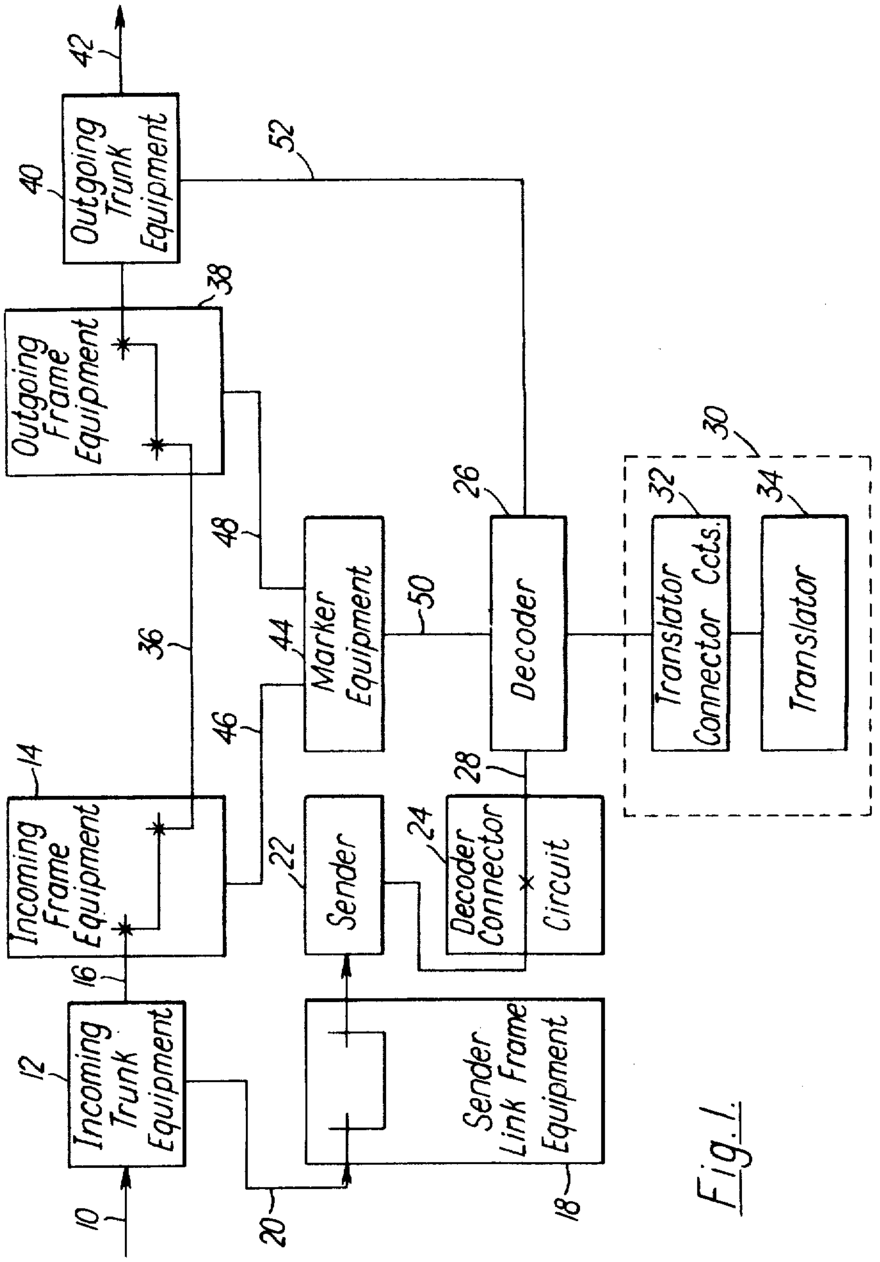

Inventors
Derek Leyburn
Bernard R. Montague
Henry K. Mattila
By Johnson, Marcus & Wray
Agents

*Inventors*
Derek Leyburn
Bernard R. Montague
Henry K. Mattila
By Johnson, Marcus & Wray
Agents Inventors
Derek Leyburn
Bernard R. Montague
Henry K. Mattila
By Johnson, Marcus & Wray
Agents Inventors
Derek Leyburn
Bernard R. Montague
Henry K. Mattila
By Johnson, Marcus & Wray
Agents Inventors
Derek Leyburn
Bernard R. Montague
Henry K. Mattila
By Johnson, Marcus & Wray
Agents

*Inventors*
Derek Leyburn
Bernard R. Montague
Henry K. Mattila
By Johnson, Marcus & Co.
Agents Inventors
Derek Leyburn
Bernard R. Montague
Henry K. Mattila
By Johnson, Marcus & Wray
Agents Inventors
Derek Leyburn
Bernard R. Montague
Henry K. Mattila
By
Johnson, Marcus & Wray
Agents Inventors
Derek Leyburn
Bernard R. Montague
Henry K. Mattila
By Johnson, Marcus & Wray
Agents Inventors
Derek Leyburn
Bernard R. Montague
Henry K. Mattila
By
Johnson, Marmo & Wray
Agents Inventors
Derek Leyburn
Bernard R. Montague
Henry K. Mattila
By
Johnson, Marcus & Wray.
Agents Inventors
Derek Leyburn
Bernard R. Montague
Henry K. Mattila
By Johnson, Maraux & Wray
Agents

TELEPHONE TRANSLATING APPARATUS

This invention relates to telephone systems employing automatic switching equipment for the establishment of communication paths.

The invention is more particularly concerned with electrical code translators such as are employed in communication switching systems and automatic telephone systems.

The input signals to communication switching systems represent either data to be processed by the system or coded instructions which specify procedures to be followed. Translators are employed in such systems to convert switching information from one code form to a more convenient code form and to examine and classify this information to provide instructions to the switching systems.

In large multi-office telephone switching systems, the first three digits of subscriber directory numbers are office code digits identifying the local office to which the subscriber line terminates. When a call is initiated, the directory number is dialed and the digits are stored in common central office equipment, known as registers, which is responsive to the pulses incoming from the calling party. After registration is accomplished, the information is passed to one or more translators to select an outgoing trunk and to effect the extension of the call to a called subscriber line. The registered office code information may be indicated to the translator equipment by input conductors according to any one of a plurality of different known codes, such as a decimal code or a binary code or combinations of these and the output information from the translator may be indicated by information on the output conductors according to the same or a different code.

The first three, or office code digits, which are designated A, B, and C, respectively, are processed in a yes-no translator to determine whether the called subscriber station is within range of the local circuits of the switching exchange or if a sender is required to complete the call to stations outside the range of its local circuits. These digits, which have been stored in the A, B, and C registers are read out in parallel to provide input pulses to a translating network which is arranged to give a yes or no answer to the switching system. If a yes answer is obtained a sender is seized and the yes-no translator equipment is dismissed; however, if a no answer is obtained the local circuits are energized to complete the call and again the translator equipment is dismissed.

One type of telephone system is the number 4A crossbar switching system which forms a part of a nationwide toll dialing plan for operator and customer dialing toll or calls. However, the long distance operator or the customer may dial or key the information for routing a call and the switching equipment then automatically completes the call. In some crossbar offices within a toll switching system, translators have been provided in the form of card translators where information for routing calls is contained on metal cards which are stored in the card translator. This is an electromagnetic device using metal cards, electron tubes, photo transistors and transistor amplifiers. A 4A system may well have three or more of these card translators. Each card translator normally stores the metal cards in twelve storage bins and each bin may contain a maximum of 100 cards, of which 98 are coded. A blank card is placed at each end of the deck and therefore the capacity of each translator is 1,176 coded cards and 24 blank cards.

Each card contains the routing information which is used for switching a specific call from a 4A system to another toll switching system or to the local office where it terminates. Each card is mechanically coded to respond to an authorized code, typically an area code, a national office code, or an area code plus a national office code. This coding is done by using different combinations of small metal tabs on the bottom of the metal cards. These tabs are used to select, or "drop" a card into the position where its routing information can be read. When a given 4A system receives a call, it determines (from the area code or from a combination of the area code and national office code) the corresponding card which has the routing information for that call. It then selects and drops this card.

The card blanks from which the working cards are made have 118 holes and the routing information for a working card is added to the blanks by enlarging some of these holes. That is, the routing information for switching a specific call is incorporated on a given card by enlarging certain of the holes in a definite pattern. This pattern is deciphered in the following manner.

When the converted cards are in the rack, awaiting a call, the 118 holes are all lined up to form tunnels through the cards. A light source on one side of the stack of cards shines through these tunnels, activating a group of phototransistors lined up one in front of each tunnel on the other side. Nothing happens, however, since the associated transistor amplifiers are inactive. However, when a call comes in, the proper card is made to drop about three-sixteenths of an inch. This closes all of the light tunnels except the ones corresponding to the enlarged holes in the dropped card. At the same time, the transistor amplifiers are activated and those opposite the open light tunnels are energized. The resulting amplified signals are used to provide information required by other common control equipment, to switch the call. Changes in routing information are made by simply replacing cards and new routings are added by inserting new cards.

The 4A system is a crossbar system and therefore its basic element is a crossbar switch. The crossbar switch is an electrically operated relay mechanism consisting of 10 horizontal parts and 10 or 20 vertical parts. Any horizontal part can be connected to any vertical part by operation of magnets. The points of connection are known as cross points and the switch with 10 vertical parts has 100 cross points and is called a 100-point switch; the one with 20 vertical parts has 200 cross points and is called a 200-point switch.

In the above-mentioned 4A crossbar system it has been found that, in certain instances, greater speed is required than can be provided by the said card translators and associated relays. In order to provide the greater speed, systems have been designed using semi-conductor devices and techniques throughout the translator. However, such semi-conductor translators have been relatively expensive and this is a considerable disadvantage, particularly in overseas markets. Furthermore, in certain overseas markets personnel maintaining the telephone system may not be as experienced with semi-conductor systems as the personnel in the United States and this has proved a disadvantage in that it is relatively expensive to re-train personnel and the danger exists that the telephone system will not be properly maintained for efficient working.

It is an object of the present invention to provide an improved translator which may be an economical replacement of the above-mentioned card type translator and which does not suffer from the disadvantages of the above-mentioned translators using an entirely semi-conductor technique.

Accordingly, from one aspect of the present invention there is provided apparatus for translating input codes each made up of a number of code digits into translations each made up of a number of information bits representing routing information, comprising: first means for feeding input code information to a selection routing stage capable of providing routing information distinctive of, and corresponding to, the input code information; second means for feeding said routing information to a decoder unit; said decoder unit being responsive to said routing information to initiate completion of a direct route connection between a caller and a called party when a route therebetween is available; when all direct routes therebetween are indicated as not available, said decoder being capable of providing an alternate route request output signal; said alternate route request output signal being effective to operate a switching device capable of permitting a control signal to be applied to said selection routing stage whereby alternate routing information is fed to said decoder unit.

From another aspect there is provided apparatus for translating input codes each made up of a number of code digits into translations each made up of a number of information bits representing routing information, comprising: first means for feeding input code information to a selection routing stage capable of providing routing information distinctive of, and corresponding to, the input code information; second means for feeding said routing information to a decoder unit; said decoder unit including a plurality of decoder stages and being responsive to said routing information to initiate completion of respective route connections between a number of callers and respective called parties, each caller being associated with a respective decoder stage; an exclusion gate unit connected to the output of said decoder unit; a first and a second translator preference unit controllable by said exclusion gate unit to be normally respectively responsive to respective ones of said decoder stages to continue said route connections, and control third means capable of rendering a selected first one of said translator preference units non-responsive to respective decoder stages and the second of said translator preference stages responsive to all said decoder stages.

From yet another aspect, there is provided apparatus for translating input codes each made up of a number of card digits each made up of a number of information bits representing routing information, comprising: first means for feeding input code information to a selection routing stage capable of providing routing information distinctive of, and corresponding to, the input code information; second means for feeding said routing information to a decoder unit said decoder unit including a plurality of decoder stages and being responsive to said routing information to initiate completion of respective route connections between a number of callers and respective called parties, each caller being associated with a respective decoder stage, an exclusion gate unit connected to the output of said decoder unit; said exclusion gate including a plurality of exclusion gate stages each associated with a respective one of said decoder stages and, control means for rendering selective ones of said exclusion gate stages non-responsive to the respective ones of said decoder stages; whereby when a number of exclusion gate stages are responding to associated respective decoder stages the remainder of said exclusion gate stages are rendered non-responsive to their respective associated decoder stages until said number of exclusion gate stages has continued the respective corresponding number of said route connections.

Figure 2:
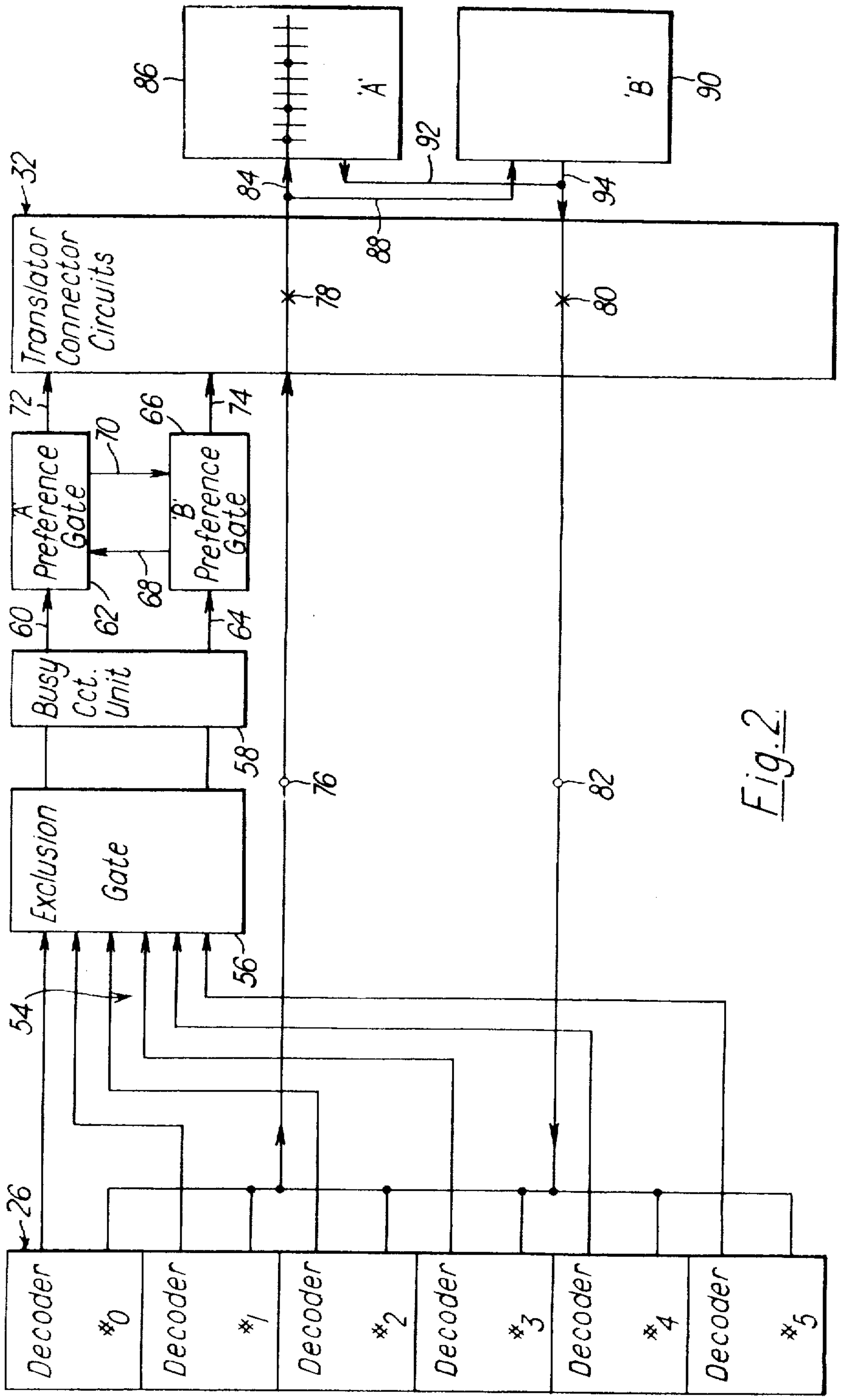
Figure 3:
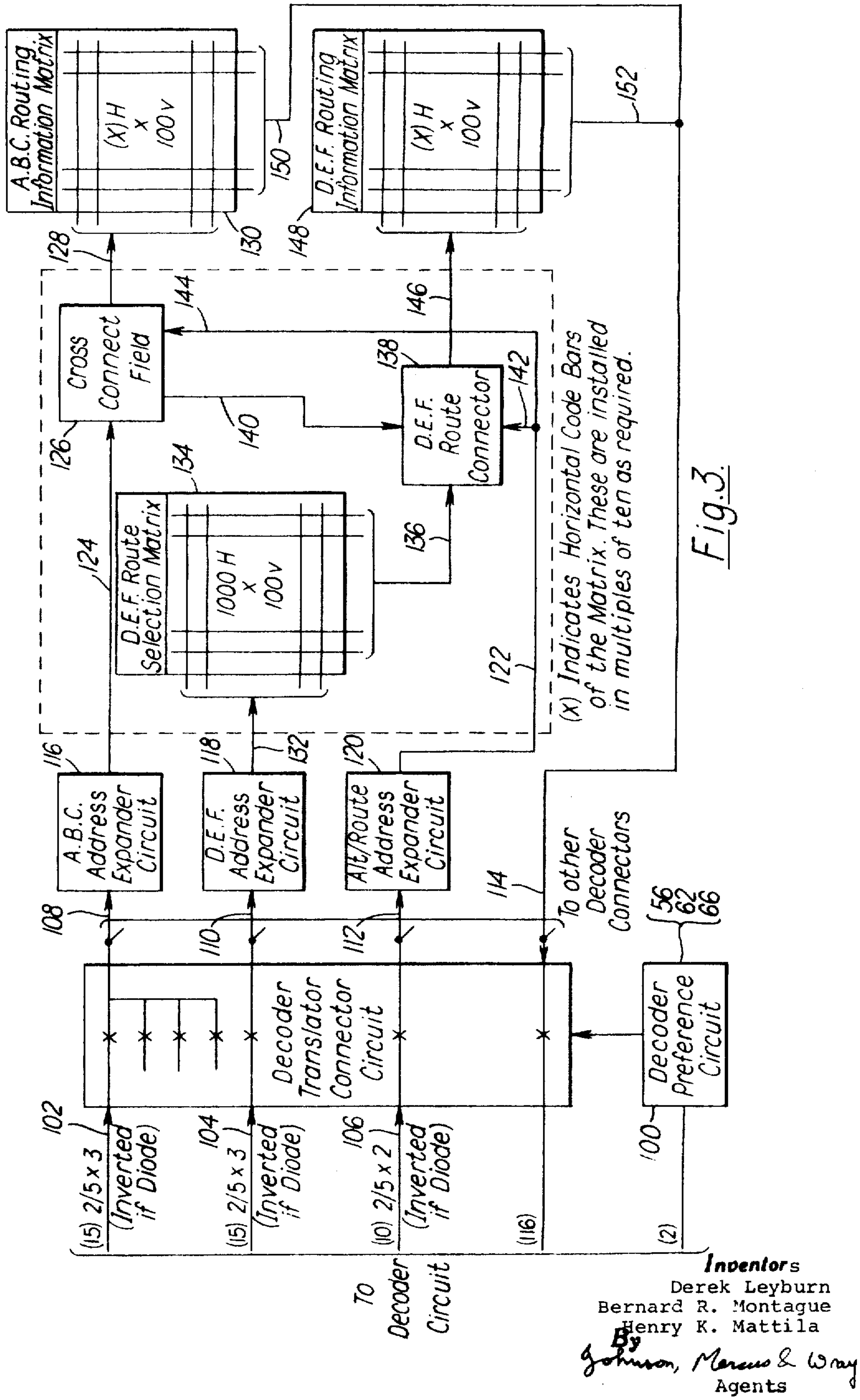
Figure 4:
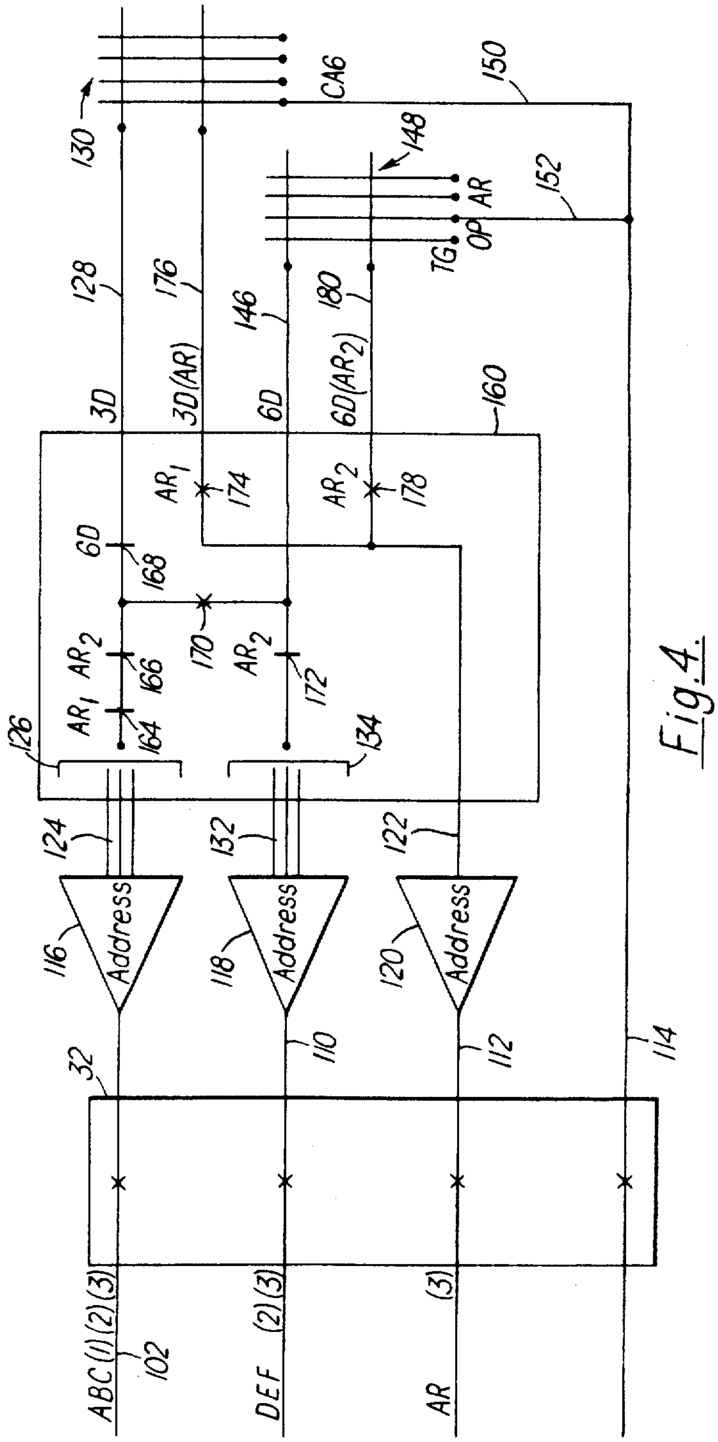

One embodiment of the invention will now be described by way of example, with reference to the accompanying drawings in which:

FIG. 1 is a diagrammatic representation of a local crossbar office using a translator according to the present invention, FIG. 2 illustrates a part of the system of FIG. 1, in block form, including the exclusion gate and two preference translator gates, FIG. 3 is a more comprehensive representation of a part of the system, FIG. 4 diagrammatically illustrates the system of FIG. 3 but in a simplified form for explanatory purposes, FIGS. 5 through 12 diagrammatically illustrate typical circuits, utilizing relays, of the actual circuit arrangements for some of the various stages illustrated in block form in FIGS. 1 through 4.

Referring to FIG. 1, a local toll switching system includes incoming trunk lines, identified as 10, entering incoming trunk equipment 12 (normally relay equipment), connection lines being provided from said incoming trunk equipment 12 to incoming frame equipment 14 by way of lines 16 and to the sender link frame equipment 18 by way of connection lines 20. A typical sender 22 is connected, as shown, to the sender link frame equipment and serves a decoder connector circuit 24 which has access to the decoder 26 along connection lines 28, the decoder 26 having access to the translator equipment 30 comprising the translator connector circuits 32 and the translator 34.

It will be seen that the incoming frame equipment 14 is connected, via connections 36 to the outgoing frame equipment 38 which is itself connected to the outgoing trunk equipment 40 associated with the outgoing trunk lines 42. The incoming frame equipment 14 and the outgoing frame equipment 38 are both connected to the marker equipment 44 by way of respective connections 46 and 48, the marker circuits 44 being themselves connected by connections 50 to the decoder circuits 26, the decoder 26 being itself connected to the outgoing trunk equipment 14 by way of connections 52.

The present invention is particularly concerned with the translator equipment within box 30 of FIG. 1 and part thereof is shown, for convenience, in block form in FIG. 2 which also includes diagrammatic representation of the decoder unit 26.

The six stages of the decoder 26 are indicated in FIG. 2 and it will be seen that connections are therefore provided along lines 54 to the exclusion gate 56. The six stages are actually six distinct separate units capable of processing six unique calls independent of each other. (Six decoders are shown, therefore six calls can be served simultaneously.) However, all decoders share a common translator through which these decoders are served serially and in order of preference according to their position in the exclusion gate and preference circuit.

The output of the exclusion gage 56 is fed through a busy circuit unit 58 along connection 60 to an A preference gate 62 and along connection 64 to a B preference gate 66. Interconnections between the preference gates 62 and 66 are indicated by the representative connections 68 and 70.

An output from the A preference gate 62 is fed along connection 72 to the translator connector circuits 32 (FIGS. 1 and 2) whilst an output from the B preference gate 66 is fed along connection 74 also to the translator connector circuits 32.

Besides the output connections 54, the stages of the decoder unit 26 also provide output signals along 38 leads comprising an address connection 76 to point 78 within the translator connector unit 32. Similarly, from point 80 within translator connector unit 32 there are provided 116 leads on a read-out connection 82 as an input to each of the stages of the decoder unit 26.

An output from the translator connector 32 is fed from point 78 along connection 84 to an A translator 86 and along connection 88 to a B translator 90. The A translator 86 is utilized to serve the even numbered decoder stages in decoder unit 26 whilst the B translator 90 is utilized to serve the odd numbered decoder stages in the decoder unit 26. Output connections 92 and 94 from the A and B translators 86 and 90 are connected to the output point 80 to which is connected the read-out connection 82.

In FIG. 2 there is illustrated a part of the system according to the present invention so as to illustrate the arrangement of the exclusion gate 56 and the preference gates 62 and 66. Referring to FIG. 3 there is illustrated a more comprehensive representation of the part of the system according to the present invention and it will be seen that the exclusion gate 56, the preference gate 62 and the preference gate 66 are included within the single block, decoder preference circuit 100. The decoder translator connector circuit 32 is also identified in FIG. 3, including a part of the decoder connector 24 and it will be seen that the various address leads identified as 76 in FIG. 2 are, in FIG. 3, represented in smaller groups by the lines 102, 104, and 106. It will be appreciated that a plurality of lines are actually represented as is diagrammatically illustrated within the decoder 32 in association with the line 102. Further decoder connectors will actually be connectable onto the same connector output lines 108, 110, and 112, and will also be connectable to the return line 114.

As is well known, in the crossbar 4A translator, when a decoder is seized by an incoming sender, it uses the first three digits, A, B, C, registered in that sender, to make a three digit translation in its home translator. Thus in the system of FIG. 3 there is provided an A, B, C address circuit 116, utilizing relays or diodes. A DEF address circuit 118, again using relays or diodes is also provided when three digits are insufficient to determine the route for the call. The DEF address together with the ABC address thus provides facility for six-digit translation. It will be appreciated that the alternate route address circuit 120 is not used on first translations. On first translations, the read-out from the ABC routing information matrix 130 or the DEF routing information matrix 148 includes the appropriate alternate route address to the decoder which indicates "COME AGAIN FOR A SECOND TRANSLATION WITH THIS ALTERNATE ROUTE ADDRESS IF ALL TRUNKS IN THE FIRST ROUTE ARE BUSY." The alternate route address circuit 120 is therefore only used on second or subsequent translations when all trunks in the group indicated for a prior translation are found to be busy.

The output connections 124 of the address circuit 116 are connected to a cross-connect field 126 which may be constructed utilizing wired logic or matrix logic (to be described below). An output from the cross-connect field 126 is supplied along connections 128 to an ABC routing information matrix arrangement 130, which is for read-out of information. It will be appreciated that the connection or connections 128 will be selected in accordance with the route to be chosen.

The DEF address/expander circuit 118 is connected via connection 132 to a DEF route selection matrix unit 134, which may utilize a wired logic, capable of providing an output along connections 136 to a DEF route connector 136. The DEF address 118 is energized when the decoder 26 (FIG. 1) has received a "come-again-siz" indication on lines 114 from a prior ABC translation in matrix 130. The route connector 138 is also adapted to receive an input from the cross-connect field 126 along the connections 140, and also an input along connection 142 from the address circuit 120, which also provides an input along connection 144 to a further input of the cross-connect field 126. An output from the route connector 138 is provided along connection 146 to a DEF routing information matrix 148 as shown in FIG. 3. Matrices 130 and 148 may, in practice, comprise a single matrix arrangement as will be appreciated. Outputs from the matrices 130 and 148 are provided along connection 150 and 152 to the common line 114.

In the first case then, in operation, information comes into the translator for a three-digit translation from the ABC routing information matrix. This tells the decoder which trunk group is required to get a trunk to the office for this particular call. At the same time as giving this information to the decoder, the decoder receives the information as to what alternate route would be used if there were no trunks available in this first trunk group. So, now, if the decoder finds all trunks in the original group busy, it will come back to the translator this time with alternate route address 120. The effects of an address in alternate route 120 over lead 122, and 144 disables the information that is on leads 124 to cross connection field and also selects an address in the routing information matrix via 128. This gives a different read-out back to the decoder concerning the alternate route.

In the second case, if the translator had received a six-digit translation, this is equivalent to something on the ABC address, something on the DEF address, a direction to the DEF routing information matrix and also to the information for that particular six-digit translation coming back to the decoder together with one indication as to what the alternate route would be for "all trunks busy." In this case, the decoder has encountered all the trunks busy, then the first trunk route comes back with this alternate route address. The effect this time is the signal on lead 142 will disable the information that is on lead 136 and also disable the information that is on lead 124 either via the route connector or the cross-connected field 126, will select its own address in either the ABC routing information matrix or the DEF information matrix and give the decoder the information on the alternate trunk route.

The system of FIG. 3 may conveniently be effective as a six-digit diode matrix translator for the No. 4 crossbar system.

It will be appreciated that in the above disclosure the digits ABC can represent two types of information as will be seen below.

ABC=represents exchange code in own area or

=the area code of a foreign area

DEF=exchange code within a foreign area (the six digits ABCDEF are not required if there is only one trunk group between caller's own area and the required foreign area)

In FIG. 4 there is diagrammatically illustrated the system of FIG. 3 but in a simplified form so as to illustrate one broad aspect of this invention. From FIG. 3 it will be seen that the DEF route selection matrix 134, the cross connect field stage 126 and the route connector stage 138 may all be regarded as falling within a single block identified as 160. In FIG. 4 that block 160 is diagrammatically represented in simplified form so as to show the inter-connections which are achieved, in practice, by the stage 160.

For simplicity of explanation, FIG. 4 reproduces, with the same numbers, some of the units of FIG. 3. It is believed that the arrangement of the system illustrated in FIG. 4 can best be considered by dealing with the operation thereof.

When the telephone system receives the first three digits, or the only three digits, ABC, on the first (1) input to the system, these digits are effective through the decoder translator connector circuit 32 and are fed therethrough to the ABC address circuit 116 which is, in fact, an expander circuit designed to expand the input on selected ones of 15 lines onto a selected one of 1,000 lines identified generally as 124. As will be appreciated, the input ABC comes on line 102 which actually comprises 15 lines, five being allocated to the A digit, five being allocated to the B digit, and five allocated to the C digit. The input information is coded in a 2-out-of-5-code.

After transformation in the address stage 116, the respective lines 124 have an energizing voltage applied thereto which is fed to the stage 160. Referring to FIG. 4 it will be seen that the continuation from the leads 124 through the stage 160 onto the connection 128 is, effectively, by way of the cross connection field 126 which actually includes one or more of the normally closed contacts in line 128, i.e., 164, 166, and 168. The normally closed contacts 164 and 166 may be termed alternate route contacts (A $R_1$ and A $R_2$) which are controlled by relay windings associated with connection 122. Similarly the normally closed contact 168 may be regarded as a six-digit (6 D) contact controlled by a relay winding associated with the selection matrix 134. A connection between the 3D line 128 and the 6D line 146 is achieved by way of a cross connection including a normally open relay contact 170 which is controlled by the 6D circuit controlling relay contact 168. In a similar manner a normally closed contact 172 is connected in line 146 (FIGS. 3 and 4) and is adapted to be controlled by the relay winding in connection 122 which is also adapted to control a normally open contact 174 in the three-digit alternate route line 176 and also to control a normally open contact 178 in the six-digit alternate route line 180, it being appreciated that single lines are shown in the figure, but, in fact, there may be more than one actual line.

The A B C routing information matrix 130 is also illustrated in FIG. 4 and, in response to its input information selects a corresponding output. For explanation purposes one output, the "come again 6" output, line 150 is indicated in FIG. 4. Similarly the D E F routing information matrix 148 is illustrated in FIG. 4 and it will be seen that three outputs are the trunk group output (TG), the output pulse type—line (OR) and the alternate route line (AR). For simplicity, connection 152 is made to the O P line, a pulse thereon indicating the type of output pulses which are appropriate.

When a caller dials, then the A B C digit information appears on line 102 of FIG. 4, is processed through stages 32 and 116 onto the appropriate connections 124. It then passes out on the appropriate lines 128 and, by known matrix techniques, selects an appropriate one of output lines from the matrix 130. If the "come again 6" output is selected then an output appears on 150, is fed back along line 152 to the decoder stage preceding stage 32. The decoder stage then feeds the D E F digits, as the second operation (2), along the connection 110. At the same time the A B C digits are still present, as part of the second operation (2), on line 102. The D E F digits are processed through the address stage 118, after which the above-mentioned relay is energized to open the relay contact 168. Thus the A B C digit information is present at the contact 166 but is stopped from passing onto line 128. However, contact 170 is now closed so that the A B C information on line 102 and the D E F information on line 110 are combined so as to provide the six-digit information on line 146. This input to the matrix 148 is effective, in known manner, causing the matrix 148 to give the outputs required. These include the three most significant signals representing the required trunk group (TG), the type of output pulses (OP) and the alternate route information (AR). The matrix 148 also supplies the other additional information which is normal in a telephone system corresponding to the input digits. But if the output from the matrix 148 is fed back to the preceding decoder stage on connection 114 and the decoder stage finds that all available trunks are busy, then the AR signal is sent along connection 112 so as to energize the alternate route selection circuits. At the same time the A B C D E F digit information is maintained on the connections 102 and 110. The signal pulses on the alternate route connections 122 are effective to energize a six digit relay capable of controlling the contacts identified in FIG. 4 as AR2. It will be appreciated that the contacts identified as AR1 are the appropriate contacts for the three-digit alternate route connection.

When the six-digit relay is energized, due to the information on connection 122, it operates to open the contact 166, the contact 172 and to close the contact 178. Thus the A B C D E F information is disabled and an alternate route signal is passed along connection 180 to the matrix 148. The output information matrix 148 is now changed so as to correspond to the alternate route and the alternate route information is now passed back along connection 114 to the preceding decoder stage. This decoder stage (26 in FIG. 1) now completes the connections through the available route whereby the caller is connected with the called party. The three-digit information A B C on line 128 is fed into the matrix 130 and then the information on 114 fed to the decoder stage in the decoder. If the decoder finds that all the trunks in the group are busy, the decoder then selects the alternate route information out of the information it had on line 114 and issues suitable voltage information, in a second operation (2), on the connection 112 (FIG. 4). This results in energization of the relay $AR_1$ whereby the appropriate contacts are switched. The contact 164 is opened and the contact 174 is closed whereby the A B C information is disabled and the alternate route signal is fed along connection 176. The matrix 130 then gives out the information corresponding to this alternate route and this results, via connection 114, in the decoder operating to select an idle trunk in that alternate route, presuming one is available. Thus the caller is connected to the called party by way of the alternate route in this second operation (2).

The output lines TG, OP and AR etc. in matrices, 130 and 148 may actually be a plurality of pairs of lines, each pair providing 2 out of 5 coded information. Taking each in turn, they may represent:

| | | |
|---|---|---|
| | 1...... TG | |
| | | Trunk group START in 2/5—number of first trunk in the group. |
| | | Trunk group END in 2/5—number of last trunk in the group. |
| This is actual number of trunk frame. | | Trunk frame—to look at—tens digit—2/5. |
| | | Trunk frame—to look at—units digit—2/5. |
| | 2...... OP | is 2/5 code. |
| | 3...... AR | Tens digit in 2/5. |
| | | Units digit in 2/5. |

It will be appreciated that whereas relays have been referred to above, the relays and their appropriate contacts may be replaced by any type of electrical or electronic switching device. Semi-conductor switching devices immediately come to mind, the substitution thereof being considered within the ability of a man skilled in the art. One semi-conductor device which seems to show particular promise as an equivalent switching device is the field controlled switch of H. L. D. Eng which is the subject of U.S. application Ser. No. 844,748 (Filed July 25, 1969) and was the subject of a paper presented at The International Conference on Advanced Microelectrics at Paris, France, April 6–10, 1970.

In FIGS. 5 to 12, there are diagrammatically illustrated typical circuits, utilizing relays, of the actual circuit arrangements in some of the various stages illustrated in block form in FIGS. 1 to 4.

In the relay circuit diagrams, the usual identification has been adopted whereby relays are identified by letters, in addition to numbers, representing their function or place in the respective circuit. The associated contacts are identified by the same, or corresponding, letters and/or numbers. Where a plurality of contacts are associated with one relay, then the various contacts are numbered in succession.

Figure 5:
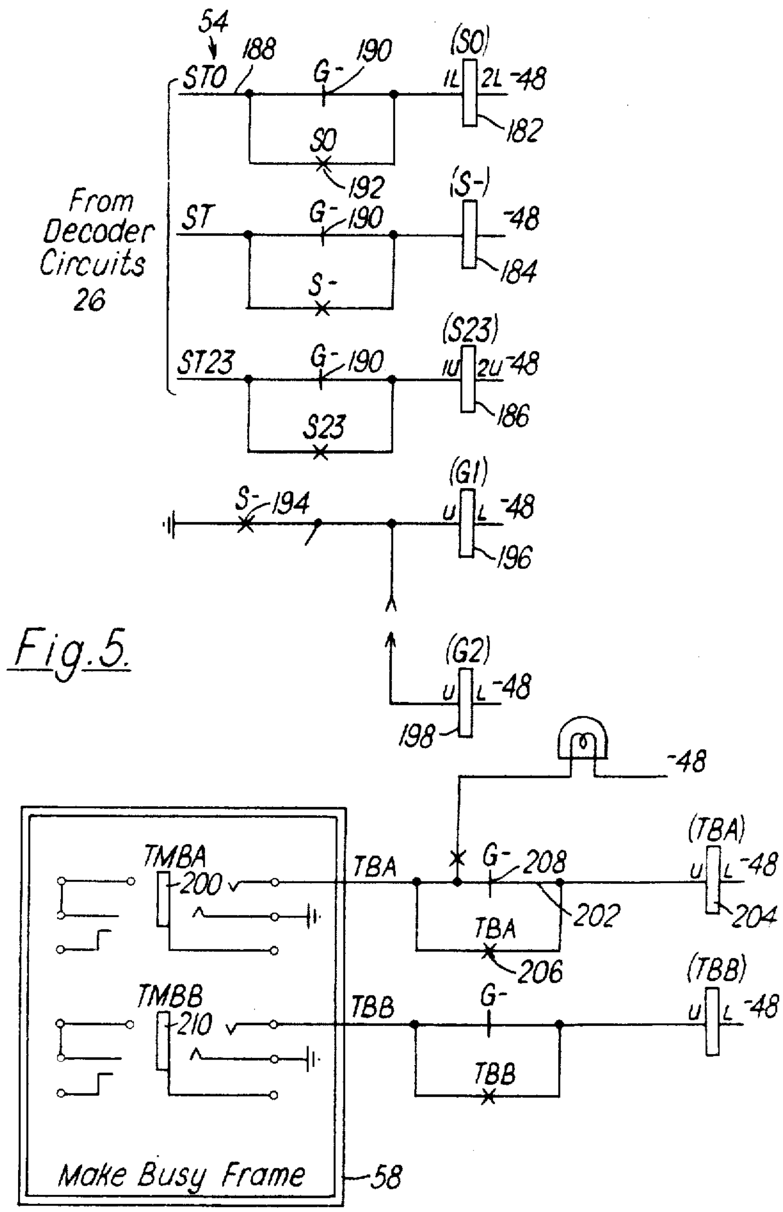
Figure 6:
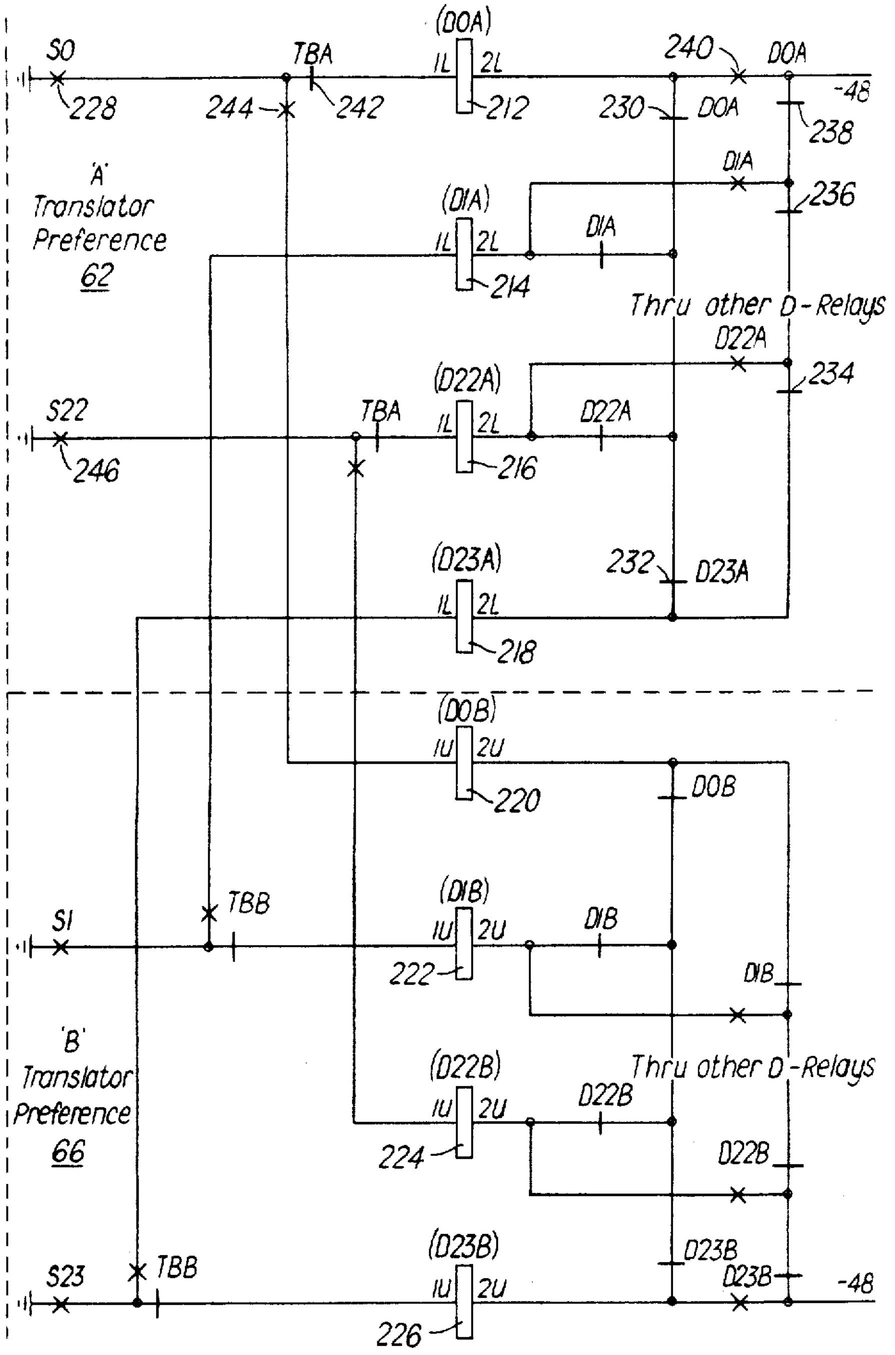

In FIGS. 5 and 6 there is diagrammatically illustrated the decoder-translator connector circuit, identified as 32 in FIGS. 1, 3 and 4 but including the exclusion gate 56, the busy circuit 58, and the AB preference circuits 62 and 66 of FIG. 2. In this circuit, no transfer takes place until all the decoder stages already within the gate are finished.

It should first of all be explained that the letters used in the relay circuits are abbreviations of particular descriptive words as below:

S: Start
G: Gate
D: Decoder
C: Connector
R – A = Alternate Route so far as the decoder is concerned (not the letters are reversed but so far as the translator is concerned this is Route Advance)

The digit relays are identified by the letters A B C D E F and appear in succession.

In FIG. 5 it will be seen that the 23 lines 54 from the decoder circuit stage 26 are each connected to one side of a relay winding S, the other side of which is connected to –48 volts. Three of the S relays 182, 184, and 186 are shown with their input leads (ST). When a decoder 26 has received the first three digits of a called number it applies a ground potential to the associated ST lead 102 (FIG. 4) to seize the respective decoder-translator connector 32. This ground potential operates the associated S-relay providing the G-relays are released (gate opened). In other words in FIG. 5, a ground potential is applied to lead 188 and this results in operation of relay 182 since the normally closed contact 190 is closed. Operation of relay 182 closes the normally open holding contact 192 as well as a normally open contact 194 in series with a G relay 196. Thus relay 196 is connected between ground potential and –48 volts whereby it operates to open the contact 190 in series with the S-relay 182. Similarly relay 196 opens all the G-contacts (190) in series with the remaining S-relays, such as 184 and 186. Thus the other decoders are excluded until that decoder within the gate, i.e., applying a potential to 188, has been served in a manner to be described below.

If there should be a simultaneous application of ground potential to several of the leads 188, i.e., simultaneous seizure, then all the corresponding S relays for all the calling decoders will operate. These S-relays in turn will operate the G-relays (gate closed) to exclude any later calling decoder until those within the gate have been served. This is to prevent decoders which are high in the preference chain from permanently excluding decoders with a lower preference. It will be appreciated that as each decoder within the gate is served, the associated S-relay, e.g., 182, is released. When all the S-relays have released then the relay 196 (G1) is also released because all the S-relay contacts 194 are released so as to return to their normally open position. It will be appreciated that a plurality of contacts 194 is provided, one for each of the S relays 182 etc., all the contacts 194 being in parallel. A representative relay G2 (198, FIG. 5) is shown and when all the relays G1 and G2 are released, then the gate is now open and the later calling decoders 26 will be admitted.

In FIG. 5 there is also illustrated the "busy circuit" 58 of FIG. 2. By way of example, this is illustrated as a manually operable busy circuit but it will be appreciated that, in some instances, an automatically operable circuit may be provided whereby, if trouble occurs, the busy circuit automatically comes into effect. The busy circuit is effected when a plug is inserted in the busy jack 200, so that a first ground potential is applied to the connection 202 to cause operation of the TBA relay 204 whose opposite side is connected to a second potential of −48 volts. The relay 204 has a normally open contact 206 and it will be seen that this is a holding contact bypassing a normally closed contact 208 of the G-relays. The relay 204 also has associated additional contacts which will be described in relation to the preference circuits of FIG. 6. The make-busy circuit 58 also includes a second jack 210, the busy jack 200 being associated with one preference circuit 62 (FIG. 2) and the jack 210 being associated with the other preference circuit 66.

It will be seen from FIG. 5 that busy indicating lamps may be provided in association with the busy relays, such as 204, whereby on closure of a normally open G-contact by, for example, the G1 relay 196, then the busy lamp is illuminated so as to give an indication that the respective translator preference stage 62 or 66 is busy.

In FIG. 6, the A and B preference circuits 62 and 66 are illustrated, by way of example, using relays. It will be appreciated that the A preference circuit 62 and the B preference circuit 66 can operate together so as to serve two decoders of stage 26 at once. The A translator preference stage 62 is allocated, for convenience, to even numbered decoders whilst the B preference stage 66 is allocated to odd numbered decoder stages (compare FIG. 2). The A preference circuit 62 includes 24 relays, four of which, 212, 214, 126, and 218, are illustrated in FIG. 6 and are identified as D–A relays. In the B preference gate circuit 66, the relays thereof are identified as D–B. Twenty-four relays are again provided, only four being illustrated in FIG. 6 as relays 220, 222, 224, and 226. It will be appreciated that under normal conditions, the preference circuit 62 only serves the even numbered decoders DOA D2A D4A etc. whilst the preference circuit 66 only serves the odd numbered relays D1b D3B etc. However, when the busy circuit 38 (FIGS. 2 and 5) is operated then one preference gate is closed down and the other preference gate then accepts all the decoder stages, utilizing the remaining relays with which it is provided. The construction and operation of the preference circuits 62 and 66 can best be described by considering the operation thereof.

As mentioned above, the decoder usage is divided equally between the two translators of the system. The even numbered decoders will be served by the A translator preference circuit 62 and the odd numbered decoders by the B translator preference circuit 66. Decoders are served in the order of preference, the order being from lower numbered to the higher numbered in the A translator preference circuit 62 and from higher numbered to lower numbered in the B translator preference circuit 66. If we assume that the line 188 (FIG. 5) has been grounded, then the relay 182 is energized causing the normally open contact 228 (FIG. 6) to be closed whereby ground potential is applied to one side of the DOA relay 212, the other side thereof being at −48 volts through the normally closed relay contacts 230–238. Thus relay 212 is energized and closes its normally open holding contact 240. Operation of the relay 212 also closes a normally open contact in series with a connector relay CAOA (FIG. 7) which is itself effective to close the contact 78 and 80 in FIG. 2, whereby the ABC address is connected through and the circuit between the caller and the called party is completed.

In FIG. 6, it will be seen that the relays 214, 216, 218, 220, 222, 224, and 226 are provided with similar corresponding contacts to contacts 230, 238, and 240 which are operated so as to change their state when relay 212 is energized. In other words, the normally open contact 240 is closed so as to complete the connection to the −48 volt line by the shortest route whilst the normally closed contacts 230 to 238 are opened.

As stated above, the A translator preference circuit 62 normally handles the even numbered decoders of stages 26 and 32 whilst the B translator preference circuit 66 normally handles the odd numbered decoder stages. However, when the "-make busy frame" circuit 58 is operated, either manually or automatically, then those decoder stages which are fed to the respective one of the translator preference stages 62 or 66 are transferred to the other one of the translator preference circuits 62 or 66. For example, if it is required that an indication be given that the A translator preference circuit 62 is busy, for example, if trouble therein occurs or if it is desired to perform maintenance thereon, then a plug is inserted in the plug jack 200, or the circuit 58 operates automatically, so as to apply groung potential to the lead 202, through normally closed contact 208, whereby the relay 204 is energized. This opens the normally closed contact 242 (FIG. 6) and closes the normally open contact 244. Thus the translator preference circuit 62 is disabled and the "normally not used" relays 220, 224, etc. of the B translator preference circuit 66 are utilized when the contacts 228, etc. are operated by their respective S relays 182, 184 . . . . It is to be noted that each translator preference circuit includes a plurality of S contacts such as 228, each operated by a respective one of the S relays, 182, 184, 186 . . . of FIG. 5. For example, the relay S22 (not shown) is associated with the S22 normally open contact 246 (FIG. 6). It will be seen from this description that the busy frame circuit 58 may be utilized so as to transfer all the decoders from a selected one of the translator preference circuit stages 62 or 66, if desired.

Figure 7:
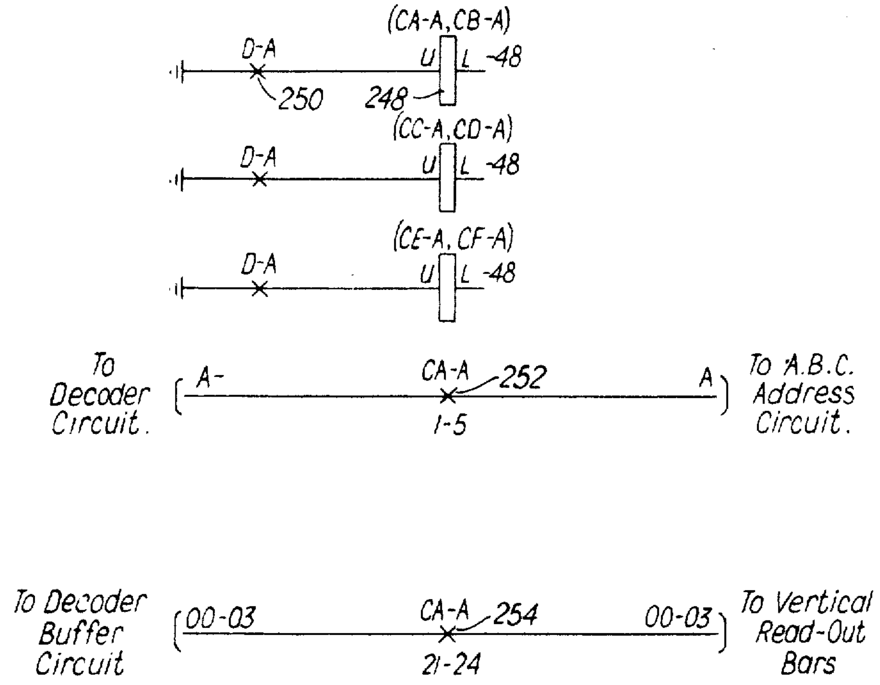

In FIG. 7 there is illustrated, by way of example, one of the above-mentioned connector relays. This relay 248 is connected in series with a normally open contact 250 which is controlled to close in response to energization of the relay 212 of the A translator preference stage 62 in FIG. 6. When it is closed, then a circuit is completed between ground potential and a −48 potential so as to energize the relay 248 whereby the contacts 78 and 80 (FIG. 2) are closed.

In FIG. 7 the normally open contact 252 connected between the decoder circuit and the ABC address circuit, is illustrated by way of example with suitable identification. It will be appreciated that this may, in part, correspond to the contact 78 of FIG. 2. Additional contacts operated by the relays such as 248 will be provided between the decoder circuits and the alternate route address circuit and the DEF address circuit. Similarly, further normally open contacts, such as 254, will be provided between the decoder buffer circuit and the vertical read-out bars—these may correspond to normally open contact 80 of FIG. 2. It will furthermore be appreciated that relay 248 may well be two relays, in practice, if an insufficient number of contacts are obtainable on one relay, which normally has only 24 contacts. Thus a total of six relays, such as 248 may be provided so as to handle the decoder stages 0 to 22 which would normally be provided. The DOA relay 212 (FIG. 6) would itself operate six relays, such as 248, CAOA to CAFA. This will be clear to the expert after consideration of the illustrated figures.

It will furthermore be appreciated that FIG. 7 is illustrative only of the respective circuits for the A translator preference stage 62 and that similar circuits will be provided for the B translator preference circuit 66. By means of circuits, such as that illustrated in FIG. 7, the address leads are connected through from the decoder stages 26 to the translator stages 86 and 90 (FIG. 2).

Figure 8:
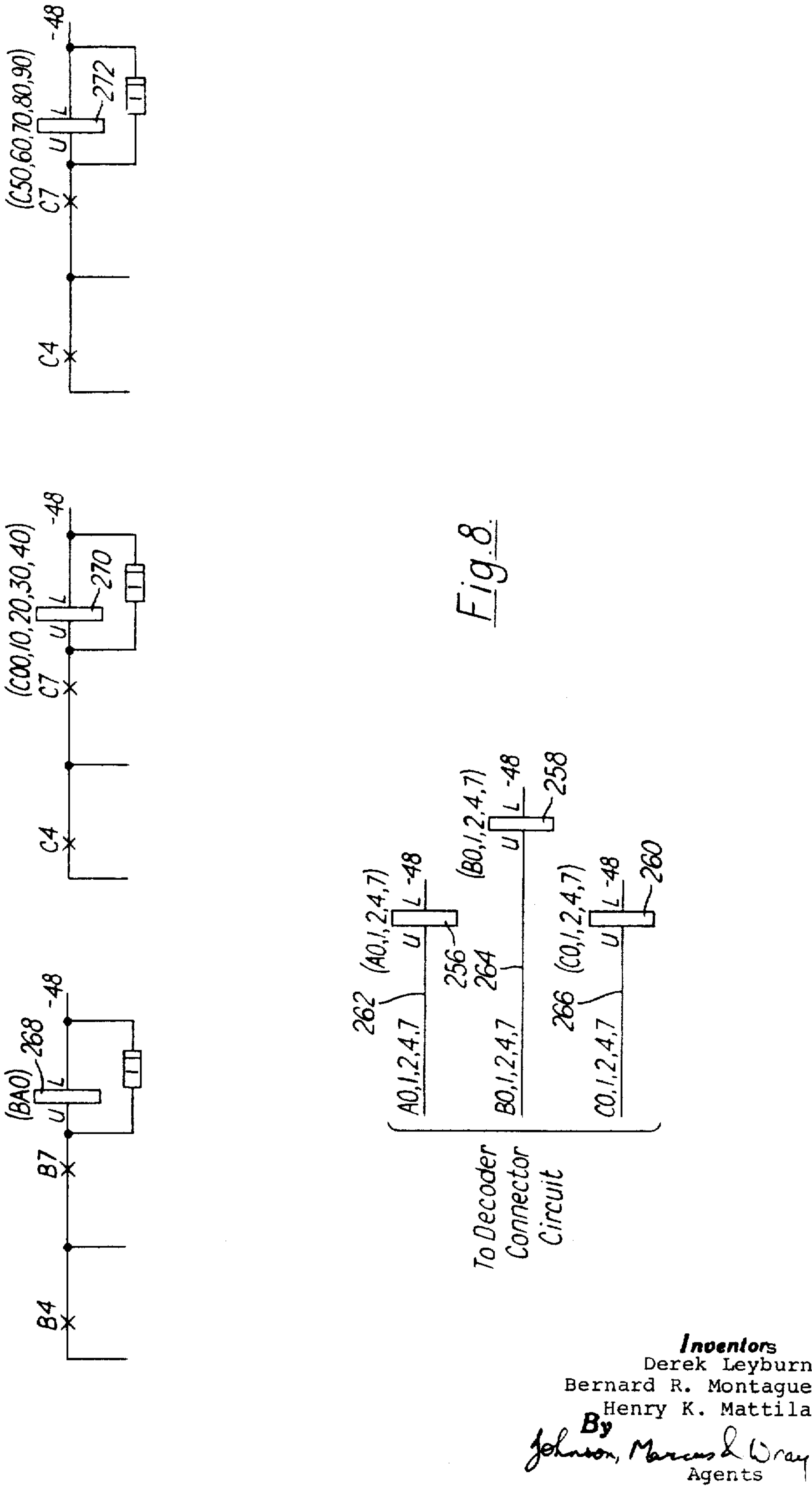

In FIG. 8 there is diagrammatically illustrated a part of the ABC address circuit. It will be seen to include the ABC relays 256, 258, and 260 respectively. These are actually each representative of five relays, identified conveniently as A—(i.e., A0, A1, A2, A4, A7), B—(i.e. B0, B1, B2, B4, B7), and C—(i.e., C0, C1, C2, C4, C7), wherein each group A,B,C, operates in a 2-out-of-5 operation according to the called three-digit code. The respective relays are connected to the decoder circuit by way of the symbolic lines 262, 264, and 266, each of which represents five actual lines corresponding to the five relays in each digit position. It will be appreciated that the A-relays 256 do not need slave relays since enough contacts are available. However, the B-relays 258 and the C-relays do require slave relays and they in turn operate associated BA- and C-relays. For example, the B-relays operate slave (auxiliary) relays such as 268 (the A standing for auxiliary), whilst the C-relays 260 operate slave relays such as the symbolic relay 270 and the symbolic relay 272 in a well known manner. Thus the result of this interconnection is that a ground potential is extended over the A-relays 256 in the ratio 1/10, over the BA-relays in the ratio 1/100 and over the C-relays in the ratio 1/1000 to the required code point of the system. This ground potential is then further extended through the system via the cross-connection field and the alternate route circuit to one of the horizontal code bars of the ABC routing information matrix, as explained below. It will be appreciated however, that there are many other ways in which this can be achieved within the scope of the present invention.

By way of example, the B4 and B7 normally open contacts are shown in series with the symbolic relay 268. Thus in the 2-out-of-5 selection, when the B4 relay 258 and the B7 relay 258 are energized, then the B4 and the B7 normally open contacts are closed so as to energize the respective slave relay 268.

Figure 9:
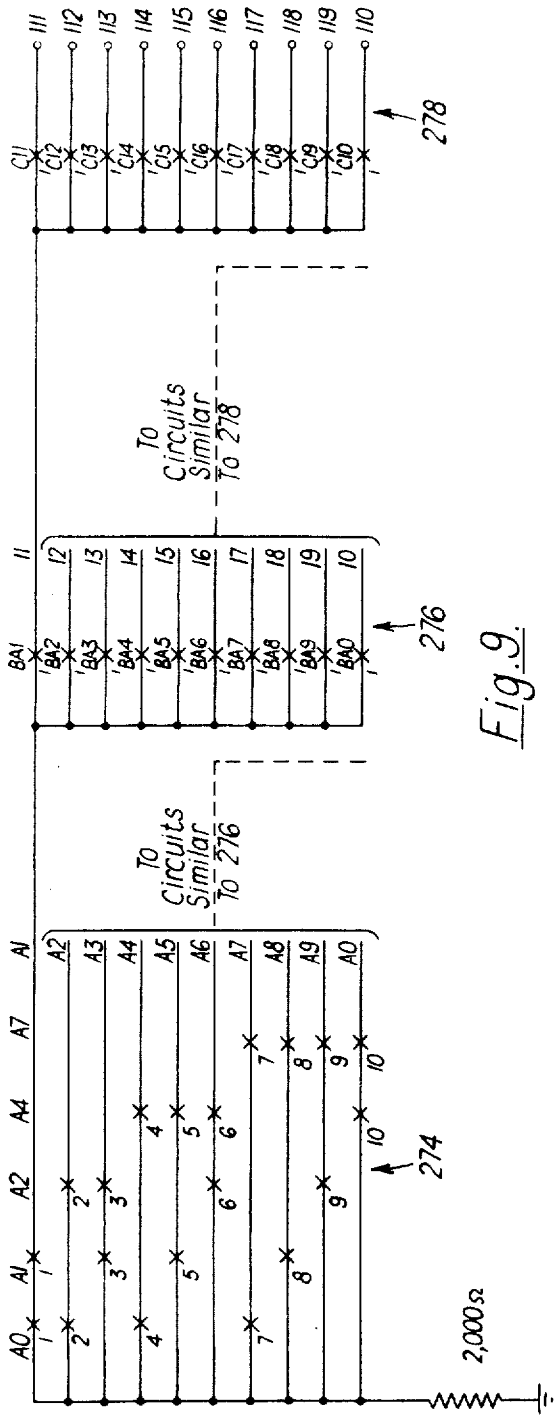

Another portion of the ABC address circuit is illustrated in FIG. 9 and it will be seen to be a part of the crossconnection field associated with the relays such as shown in FIG. 8. It will be appreciated that it includes a first contact field 274 associated with the A relays 256, a plurality of contact fields such as 276 associated with the B slave relays such as 268, and a plurality of contact fields such as 278 associated with the C-digit relays such as 270 and 272. The connection lines including the normally open contacts of the contact field 274 are, as will be appreciated, connected to similar circuits to that of the contact field 276, whilst the connection lines of the contact field 276 are connected to the further contact fields such as 278 and the contact field such as 278 have as their output connection lines the input lines of the ABC routing information 130 (FIG. 3). In this way a particular line of the matrix 130 may be selected in response to the input ABC digit code.

It will be appreciated that there is one B-contact field, such as 276, for each of the connection lines of the A-contact field 274 and one C-contact field, such as 278, for each of the connection lines of all the B-contact fields such as 276, so as to make up the required number and to be able to select the required one of the input lines of the matrix 130.

The operation of the ABC address circuit of FIG. 9 can be best understood by considering the ABC digit input equal to 112. The normally open contacts A0 and A1 will be closed in the contact field 274, the normally open contact BA1 will be closed in contact filed 276, and the normally open contact C12 will be closed in the contact field 278 so as to complete the required connection and select the required line in the matrix 130, contact C12 being the second contact in the contact field 278, all the contact fields having 10 lines.

Figure 10:
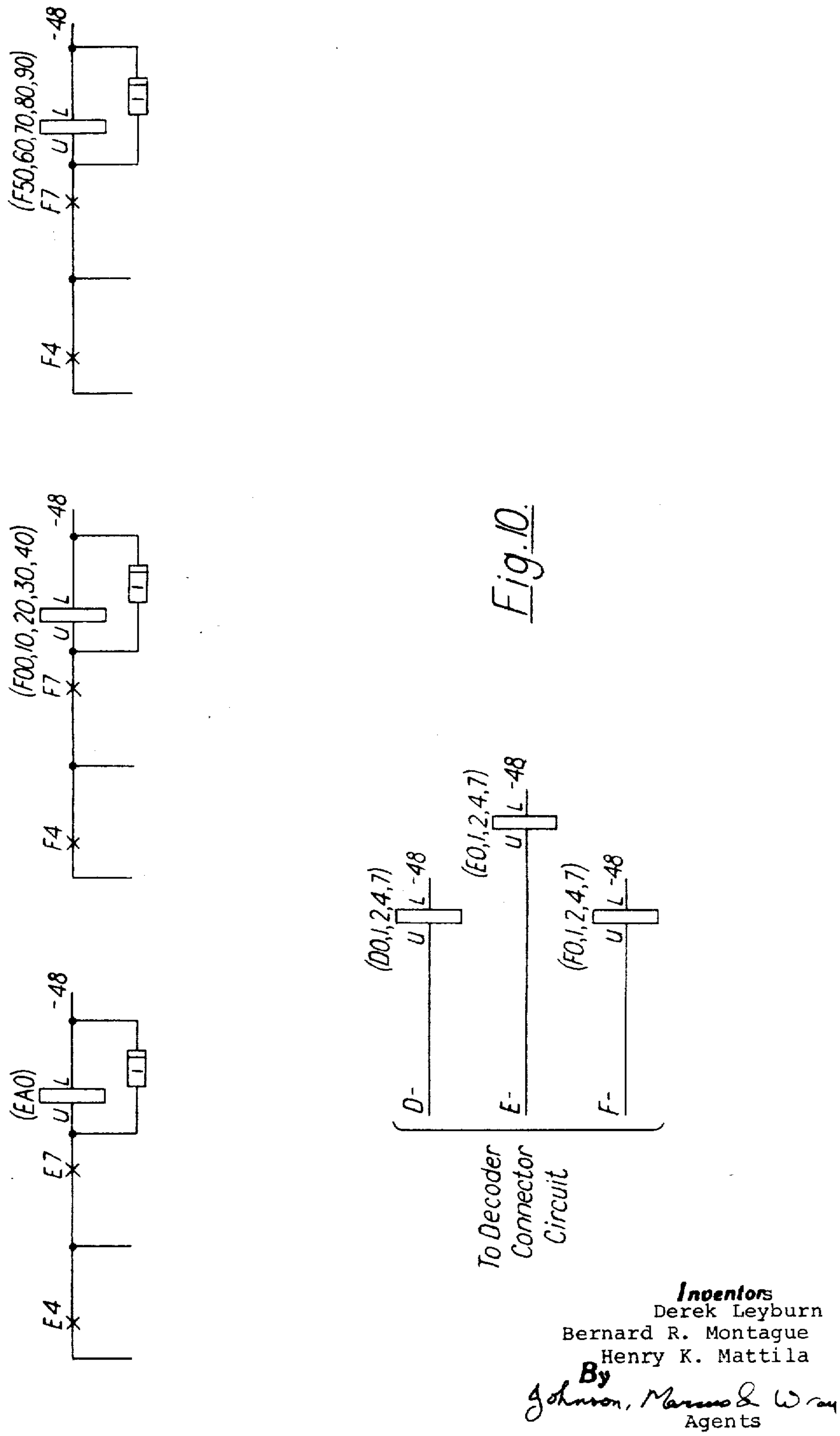
Figure 11:
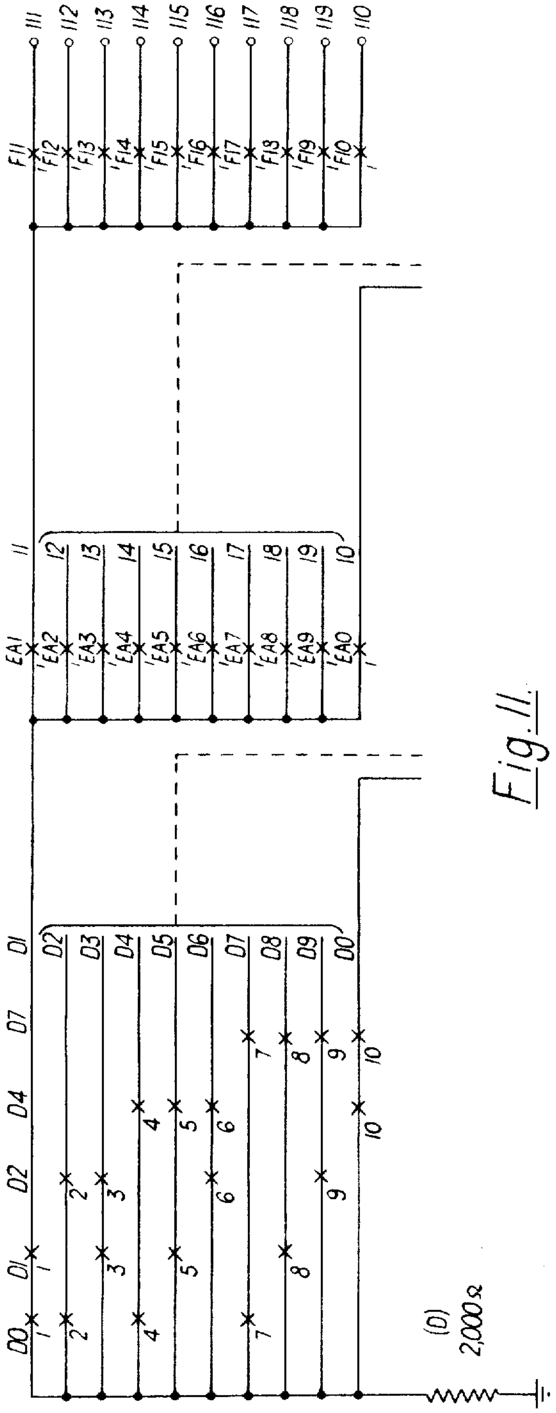

Similar circuitry to that of FIGS. 8 and 9 is provided for the DEF digits and in FIGS. 10 and 11, typical DEF address circuits are illustrated by way of example. It will be seen that they are similar to those of the ABC address circuit and therefore no further explanation is necessary except to say that a selected connection is made to the appropriate line of the DEF routing information matrix 148 of FIG. 3.

Figure 12:
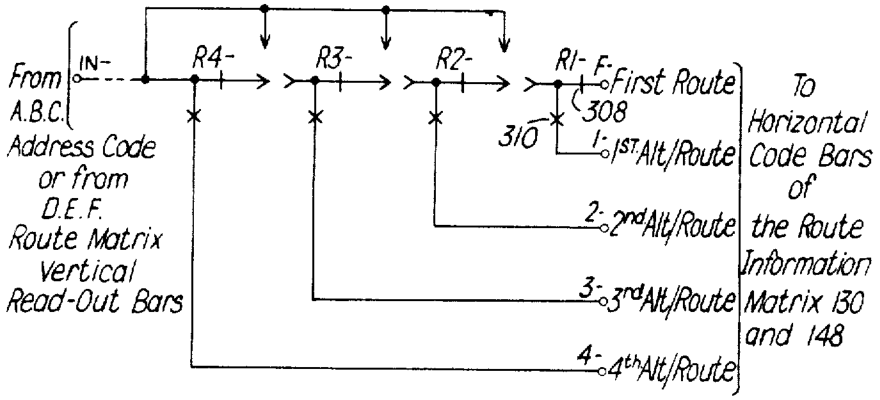
Figure 12:
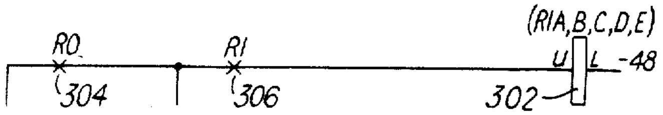
Figure 12:
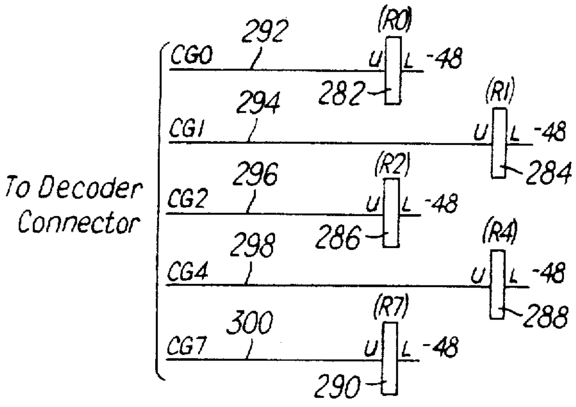

In FIG. 12, there is diagrammatically illustrated an alternate route address circuit for use in a system according to the present invention in conjunction with the decoder 26. The illustrated alternate route address circuit includes 5 relays 282, 284, 286, 288, and 290 having associated control leads 292 through 300. These control leads are connected to the decoder connector circuits (not shown) of FIG. 7, having relay contacts similar to 252 as explained above, whereby the relays 282 and 290 may be selected in a 2-out-of-5 selection. These relays are slaved back to associated contacts to provide a 1-out-of-10 selection of 10 slave relays, such as 302. For example, if the 2-out-of-5 selection energizes relays 282 and 284, then the normally open contacts 304 and 306 are closed whereby slave relay 302 is energized. This causes the normally closed contact 308 to be opened and the normally open contact 310 to be closed whereby the first alternate route is selected. As will be appreciated, since 10 slave relays, such as 302, are provided, there is a selection of 10 alternate routes, only 4 thereof being illustrated in FIG. 12. It will be seen that it is possible to provide optional facilities as to the number of alternate routes available by closing the required plug and jack contacts illustrated on the first line, identified as "first route."

As will be appreciated, with reference to FIG. 12, when all the trunks within one trunk group are busy, the circuit of FIG. 12 is addressed by the decoder 26 to select the horizontal code bar associated with the next alternate route. When this circuit is seized the R-relays, 282 to 290 operate in a 2-out-of-5 relation according to the alternate route which is selected by the decoder. It will be appreciated that in the above-mentioned card translators, this is referred to as the card group CG selected by the decoder—hence the use of the letters CG in FIG. 12. The R-relays 282 to 290, in turn operate the associated R-relays such as 302. The R-relays divert the A B C address circuit code point ground to the required horizontal code bar of the alternate route, for example, by way of the contact 310. Thus the alternate route is selected. It will be noted that relay 302 represents R1A, B, C, D, E and also of another relay (not shown) which would represent R1F, G, H, J, K, (one R-relay for each alternate route).

By way of example, some details will now be given of one system according to the present invention which was constructed.

In the constructed system, the A B C routing information matrix, comprising 130 in FIG. 3, consisted of a selectoboard program matrix. Each of the horizontal code bars could be programed by means of diode plug connections to give the required combination of vertical read-out bars X/100. The ground indication supplied to the selected horizontal code bar was thus extended over the diode plugs to the X/100 vertical read-out bars. Thus the translation which was required by the decoder is achieved whereby the call can be processed. A decoder buffer circuit (not shown) was actually provided between the decoder circuits of stage 26 and the decoder connector circuit 32. It consisted of 100 double contact "dry-reed" relays and a combination of these relays operated according to the translation received from the A B C routing information matrix vertical read-out bars. These relays, once operated, lock under control of the decoder 26 until the call has been processed.

For a six-digit translation, the constructed system utilized a decoder-translator connector circuit, an alternate route address circuit and a decoder buffer operating as described above. Codes which required three-digit translation only were also processed as will be clear from the above description. In the A B C address circuit, the code points of the first three digits of codes which required six-digit translation were cross-connected to the D E F route connector circuit and it will be appreciated that the operation of the relay and code point grounding of the D E F address circuit was identical to that of the A B C address circuit, as described above. Each code point of the D E F address circuit was permanently connected to a separate horizontal code bar of the D E F route selection matrix.

The D E F route selection matrix 148 (FIG. 3) consisted of a selectoboard matrix similar to that used for the A B C routing information matrix. The horizontal code bars were assigned—one per code point—to the D E F address circuit and the vertical read-out bars were assigned—one per trunk route—for numbering plan areas (N.P.A.) which are called over more than one trunk route. By inserting one diode plug per D E F code/N.P.A. the appropriate trunk route to that area was assigned. This matrix served several N.P.A.'s, each N.P.A. having one vertical read-out bar per trunk route to that area. When a ground potential was applied to one horizontal code bar, it was extended to one vertical read-out bar for each N.P.A. in the matrix. The D.E.F. route connector stage (138 in FIG. 3) decided which grounded vertical read-out bar should be used. The D.E.F. route connector circuit consisted of 100 "dry-reed" relays—one per D.E.F. route selection matrix vertical read-out bar. These relays were assigned and crossconnected in multiples, each N.P.A. having one relay per trunk route within that area. When the circuit was seized, all the relays associated with the called N.P.A. operated. One vertical read-out bar for this area was grounded and this ground potential was now extended to one horizontal code bar of the D.E.F. routing information matrix.

The constructed D.E.F. routing information matrix provided a translation on the vertical read-out bars in a similar manner to that described above for the A.B.C. routing information matrix.

It was found that the cost of a fully duplicated relay-diode matrix translator system was considerably less than for an equivalent installation of the existing card-type and the constructed system was also much cheaper than the Bell system standard 4A crossbar electronic translator system particularly where the total number of installed trunks did not exceed 7,000.

The average holding time per call in the constructed diode matrix translator was found to be substantially 16 milliseconds whereas the average holding time per call on the card-type translator is 150 milliseconds. Thus the constructed decoder holding time represented a reduction of up to 134 M.S. and it is therefore expected that additional saving in expense will be realized by a reduction in the number of decoders required per 4A crossbar installation.

We claim:

1. Apparatus for translating input codes each made up of a number of code digits into translations each made up of a number of information bits representing routing information, comprising:

a. first means for feeding input code information to a selection routing stage capable of providing routing information distinctive of, and corresponding to, the input code information, b. second means for feeding said routing information to a decoder unit, c. said decoder unit including a plurality of decoder stages and being responsive to said routing information to initiate completion of respective route connections between a number of callers and respective called parties, each caller being associated with a respective decoder stage, d. an exclusion gate unit connected to the output of said decoder unit, e. a first and a second translator preference unit controllable by said exclusion gate unit to be normally selectively responsive to respective ones of said decoder stages to continue said route connections, and f. control third means capable of rendering a selected first one of said translator preference units non-responsive to the respective decoder stages and the second of said translator preference stages responsive to all said decoder stages.

2. Apparatus according to claim 1 wherein:

a. said exclusion gate unit includes a respective first relay winding connected in each output digit line from the decoder unit in series with a respective first normally closed contact, b. energization of a particular first relay winding in one output digit line responsive to an output from a decoder stage being effective to cause the first normally closed contact in each other output digit line to be opened.

3. Apparatus according to claim 2 wherein said control means includes a busy circuit unit between said exclusion gate unit and said first and second translator preference unit, said busy circuit being capable of rendering the selected one of said translator preference unit non-responsive.

4. Apparatus according to claim 3 wherein:

a. said busy circuit includes a first electrical connection having a second relay winding therein and a second electrical connection having a third relay winding therein, b. said second relay winding having associated relay contacts in electrical circuit of the first translator preference unit whereby said first translator preference unit is capable of being rendered non-responsive, c. said third relay winding having associated relay contacts in the electrical circuit of the second translator preference unit whereby said second translator preference unit is capable of being rendered non-responsive, and d. fourth means for selectively causing current to flow through the second or third relay winding to energize the selected relay and operate the associated relay contacts.

5. Apparatus according to claim 4 wherein said fourth means includes:

a. a first jack having a first pair of normally-open contacts in series with said second relay winding between a first and second potential, the difference therebetween being sufficient to energize said second relay winding, and b. a second jack having a second pair of normally open contacts in series with said third relay winding between said first and second potential, the difference therebetween being sufficient to energize said third relay winding.

6. Apparatus for translating input codes made up of a number of code digits into translations each made up of a number of information bits representing routing information comprising:

a. first means for feeding input code information to a selection routing stage capable of providing routing information distinctive of, and corresponding to, the input code information, b. second means for feeding said routing information to a decoder unit, c. said decoder unit including a plurality of decoder stages and being responsive to said routing information to initiate completion of respective route connections between a number of callers and respective called parties, each caller being associated with a respective decoder stage, d. an exclusion gate unit connected to the output of said decoder unit, e. said exclusion gate including a plurality of exclusion gate stages each associated with a respective one of said decoder stages and, f. control means for rendering selective ones of said exclusion gate stages non-responsive to the respective ones of said decoder stages, g. whereby when a number of exclusion gate stages are responding to associated respective decoder stages and the remainder of said exclusion gate stages are rendered non-responsive to their respective associated decoder stages until said number of exclusion gate stages has continued the respective corresponding number of said route connections.

7. Apparatus according to claim 6 wherein:

a. each exclusion gate stage includes a respective first relay winding connected in the output digit line from the corresponding decoder stage in series with a respective first relay normally open contact, b. energization of a particular first relay winding in one output digit line responsive to an output from a decoder stage being effective to cause the first normally closed contact in each other output digit line to be opened.

8. Apparatus according to claim 7 wherein:

a. each first relay winding is in series with a normally closed gate relay contact which is itself in parallel with the respective first relay normally open holding contact, b. there is provided a gate relay winding connected in series with a plurality of normally-open relay contacts between two potentials, the difference therebetween being sufficient to energize said gate relay, and c. each of said plurality of normally open relay contacts being operable to close by a respective different first relay winding whereby on energization of a particular first relay winding, the respective one of said plurality of normally open relay contacts is closed to energize said gate relay winding to open all the normally closed gate relay contacts associated with the other non-energized first relay windings.

9. Apparatus according to claim 1 wherein said first and second translator preference units are each responsive to alternate ones of said decoder stages.

* * * * *